Patented Aug. 9, 1927.

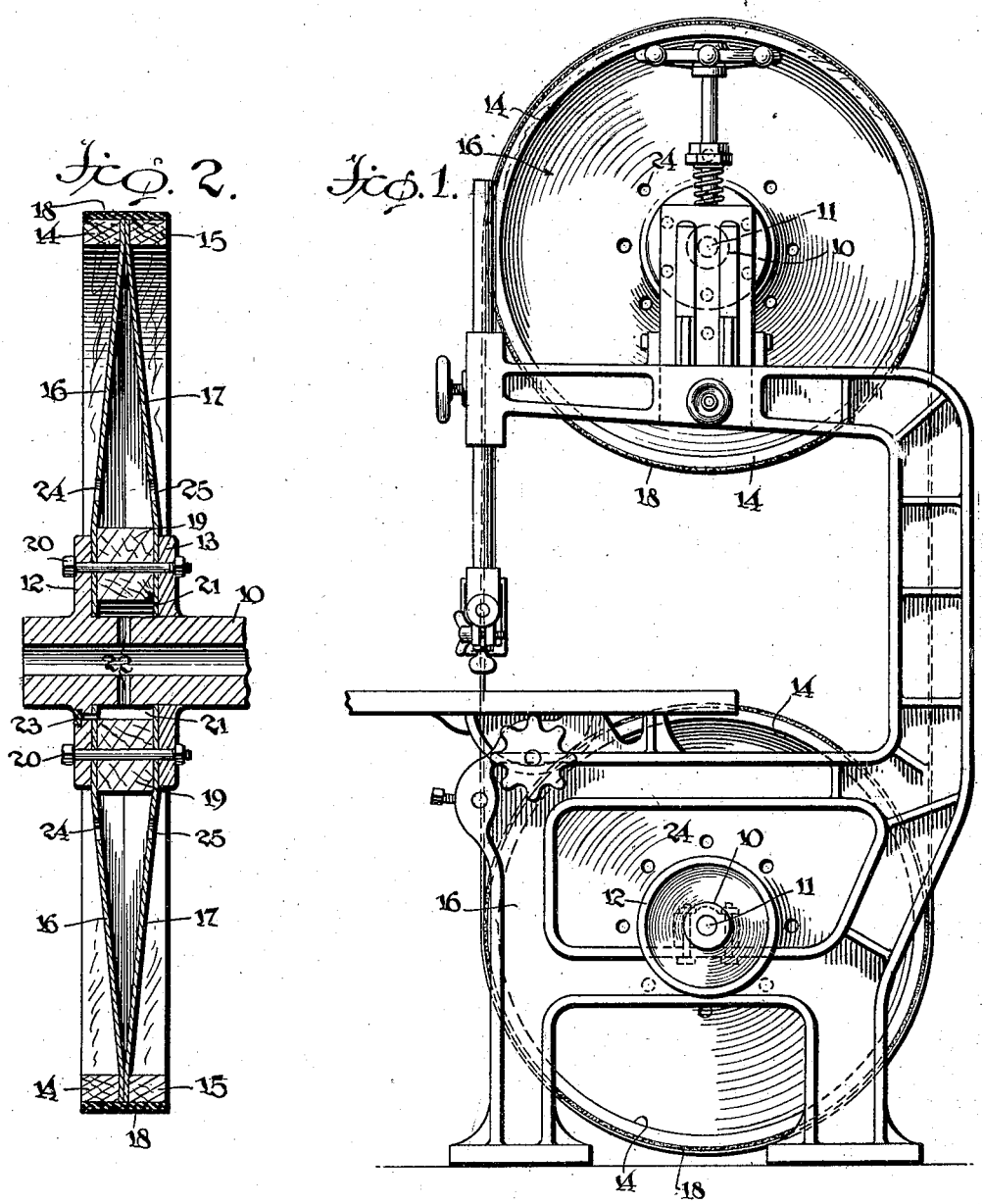

1,638,720

UNITED STATES PATENT OFFICE.

ALFRED ANDERSON, OF DUNEDIN, FLORIDA.

PULLEY WHEEL.

Application filed September 15, 1924. Serial No. 737,822.

This invention relates to wheels, more particularly band saw wheels, and has for one of its objects to provide a simply constructed device of this character which is strong and durable, inexpensive to manufacture, and adapted for use wherever a band pulley is required.

For the purpose of illustration the improved pulley is shown applied to a band saw device, to which it is more particularly adapted, but it will be understood that it is not desired to limit the invention for use in connection with any specific machine or apparatus.

In the drawings illustrative of the application of the invention—

Figure 1 is a side elevation of a conventional band saw with a pair of the improved pulleys mounted therein.

Figure 2 is an enlarged sectional detail of one of the improved pulleys.

The improved pulley includes a hub member comprising a body 10 longitudinally bored to engage the journal of a shaft 11 and with annular flanges 12 and 13 in spaced relation, one of the flanges, for instance the flange 13, being detachable and slidable on the hub as indicated in Figure 2 and constituting a movable clamping member.

The rim of the wheel is in two annular portions 14 and 15, and disposed between the rim portions are the outer parts of disk members 16 and 17. An endless band member 18, preferably of rubber or the like, bears around the outer faces of the rim sections and the outer margins of the disk members, as shown.

The disks 16 and 17 are diverged toward the hub and bear respectively against the confronting faces of the flanges 12 and 13.

Disposed between the flange 12 and the annular clamp member 13, is an annular spacer member 19, the flange, clamp member, disks and spacer member being secured in position by transverse clamp bolts 20.

The annular member 19 is considerably greater in interior diameter than the body of the hub, whereby an annular chamber 21 is provided between the hub 10, flanges 12 and 13 and the spacer member 19, to contain a supply of a lubricant which passes by oil orifices 22 to the journal of the wheel.

An oil inlet, indicated at 23, provides means for supplying the chamber 20 with the lubricant.

The improved wheel is simple in construction, with the hub and its flange, the clamp member and the disks 16 and 17 of metal, while the rim sections 14 and 15 and the spacer member 19 may be made of wood, or metal, or any other material, as preferred.

Ventilating apertures 24 and 25 are preferably formed through the disks 16 and 17, as shown.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described my invention what I claim as new is:—

A saw blade driving pulley consisting of a hub provided with a pair of opposed spaced laterally projecting annular flanges, said hub provided with ports intermediate its ends, a pair of oppositely disposed metallic convexed disks having the inner marginal portions thereof opposing said flanges, said disks being apertured and seated on said hub, an annulus interposed between said disks at the inner marginal portions thereof and spaced from said hub to provide a lubricant trapping chamber having said ports communicating therewith, said annulus providing a spacing means between the disks at the inner marginal portions thereof, hold fast devices for securing said flanges, disks and annulus together, a pair of spaced bands having the outer marginal portions of said disks positioned therebetween and forming in connection with said outer portions the rim of the pulley, and a non-metallic band circumferentially extending around said rim.

In testimony whereof, I affix my signature hereto.

ALFRED ANDERSON.